US009224544B2

(12) United States Patent
Kao et al.

(10) Patent No.: US 9,224,544 B2
(45) Date of Patent: Dec. 29, 2015

(54) TRACE STRUCTURE FOR THE TOUCH PANEL AND ELECTRICAL TESTING METHOD

(71) Applicant: Hannstar Display Corp, New Taipei (TW)

(72) Inventors: Hung-Chen Kao, New Taipei (TW); Yu-Sheng Lin, New Taipei (TW); Chia-Feng Teng, New Taipei (TW)

(73) Assignee: HANNSTAR DISPLAY CORP, New Taipei (TW)

( * ) Notice: Subject to any disclaimer, the term of this patent is extended or adjusted under 35 U.S.C. 154(b) by 192 days.

(21) Appl. No.: 13/928,119

(22) Filed: Jun. 26, 2013

(65) Prior Publication Data

US 2014/0015563 A1    Jan. 16, 2014

(30) Foreign Application Priority Data

Jul. 13, 2012  (CN) ........................... 2012 1 0243276

(51) Int. Cl.
*G01R 31/26* (2014.01)
*H01H 1/06* (2006.01)
*G06F 3/041* (2006.01)

(52) U.S. Cl.
CPC ................. *H01H 1/06* (2013.01); *G06F 3/041* (2013.01); *G06F 2203/04103* (2013.01)

(58) Field of Classification Search
None
See application file for complete search history.

(56) References Cited

U.S. PATENT DOCUMENTS

| | | | | |
|---|---|---|---|---|
| 6,956,548 | B2 * | 10/2005 | Yarita et al. | 345/87 |
| 8,581,813 | B2 * | 11/2013 | Park et al. | 345/87 |
| 2005/0052340 | A1 * | 3/2005 | Goto et al. | 345/1.3 |
| 2009/0073100 | A1 * | 3/2009 | Kim et al. | 345/92 |
| 2009/0266621 | A1 | 10/2009 | Huang et al. | |
| 2010/0265187 | A1 | 10/2010 | Chang et al. | |
| 2012/0249458 | A1 * | 10/2012 | Okazaki et al. | 345/173 |

* cited by examiner

*Primary Examiner* — Minh N Tang
(74) *Attorney, Agent, or Firm* — Muncy, Geissler, Olds & Lowe, P.C.

(57) ABSTRACT

A trace structure for a touch panel having a transparent substrate with a touch sensing region and a border region surrounding the touch sensing region, the trace structure including: a plurality of traces disposed on the transparent substrate and within the border region; a plurality of bonding pads disposed in the border region of the transparent substrate, wherein each bonding pad has a first side and a second side, and the first side of each bonding pad is connected to a corresponding trace of the plurality of traces; and at least two trace extending portions extended toward an outer edge of the border region from the second side of two of the plurality of bonding pads.

9 Claims, 4 Drawing Sheets

TRACE STRUCTURE FOR THE TOUCH PANEL AND ELECTRICAL TESTING METHOD

CROSS REFERENCE TO RELATED APPLICATIONS

This application claims priority of China Patent Application No. 201210243276.3, filed on Jul. 13, 2012, the entirety of which is incorporated by reference herein.

BACKGROUND OF THE INVENTION

1. Field of the Invention

The present invention relates to a trace design, and in particular, relates to a trace design for a touch panel and an electrical testing method.

2. Description of the Related Art

Electronic devices having a touch panel (for example, laptops, personal digital assistants (PDAs), tablet personal computers, digital cameras, and mobile phones) are getting a great deal of attention and becoming very popular with time, because of the capability to execute an input function by fingers, a stylus, or pens.

In general, a touch panel includes a glass cover lens having a black frame, and a carrier substrate (also referred to as a sensing substrate) having a touch sensing layer and a plurality of traces disposed thereon. One end of each trace is connected to a corresponding sensing electrode in the touch sensing layer, while the other end of each trace includes a bonding pad connected to a flexible printed circuit (FPC) board through an anisotropic conductive film (ACF), thereby forming an electrical connection with other circuits. Therefore, once the bonding pad and FPC board of the touch panel are bonded together, the functioning of the ACF affects the subsequent operation of the touch panel. Generally, visual inspection is used to determine if the ACF can function properly since the bonding pad is disposed on a transparent sensing substrate.

However, in order to reduce the overall thickness of the touch panel, the touch sensing layer and the plurality of traces are integrated on a single glass cover lens with a black frame. In such a manner, visual inspection to determine the functioning of the ACF is no longer viable since the bonding pad of the touch panel is usually disposed at the black frame region.

Therefore, visual inspection has been replaced with electrical measurement on the FPC board. For example, an additional testing pad (also referred to as a dummy pad) is disposed at an outer side of the bonding pad. An electrical test is applied to an electrode on the FPC board corresponding to the testing pad once the testing pad is coupled to the FPC board.

However, the additional testing pad limits the routing flexibility of the plurality of traces. Moreover, connections between the FPC board, bonding pad, and testing pad are required and thereby increase the cost and size of the FPC board. Therefore, a trace structure for a touch panel that solves the above problems is required.

BRIEF SUMMARY OF THE INVENTION

In view of the above, the invention replaces the testing pad (dummy pad) by disposing the trace extending portions so as to increase the routing flexibility of the plurality of traces, to avoid an increase in the size of a flexible printed circuit (FPC) board.

An embodiment provides a trace structure for a touch panel having a transparent substrate with a touch sensing region and a border region surrounding the touch sensing region, the trace structure including: a plurality of traces disposed on the transparent substrate and within the border region; a plurality of bonding pads disposed in the border region of the transparent substrate, wherein each bonding pad has a first side and a second side, and the first side of each bonding pad is connected to a corresponding trace of the plurality of traces; and at least two trace extending portions extended toward an outer edge of the border region from the second side of two of the plurality of bonding pads.

Another embodiment provides a touch panel, including: the transparent substrate and the trace structure of the above embodiment; a flexible printed circuit (FPC) board, having a plurality of output pads and a plurality of input pads corresponding to bonding pads, wherein the input pads are bonded to the bonding pads; and an anisotropic conductive film (ACF), disposed between the trace structure and the FPC board.

Yet another embodiment provides an electrical testing method, including: providing the touch panel of the above embodiment; and measuring a resistance value between each trace extending portion and the corresponding output pad in the FPC board.

Still another embodiment provides a trace structure for a touch panel having a transparent substrate with a touch sensing region and a border region surrounding the touch sensing region, the trace structure including: a trace disposed on the transparent substrate and within the border region; a bonding pad disposed in the border region of the transparent substrate, wherein the bonding pad has a first side and a second side, and the first side of the bonding pad is connected to the trace; and a trace extending portion, extended toward an outer edge of the border region from the second side of the bonding pad.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

The following description is of a trace structure for the touch panel and method for fabricating thereof in accordance with embodiments of the invention. This description is made for the purpose of illustrating the general principles of the invention and should not be taken in a limiting sense. The scope of the invention is best determined by reference to the appended claims.

Figure 1:
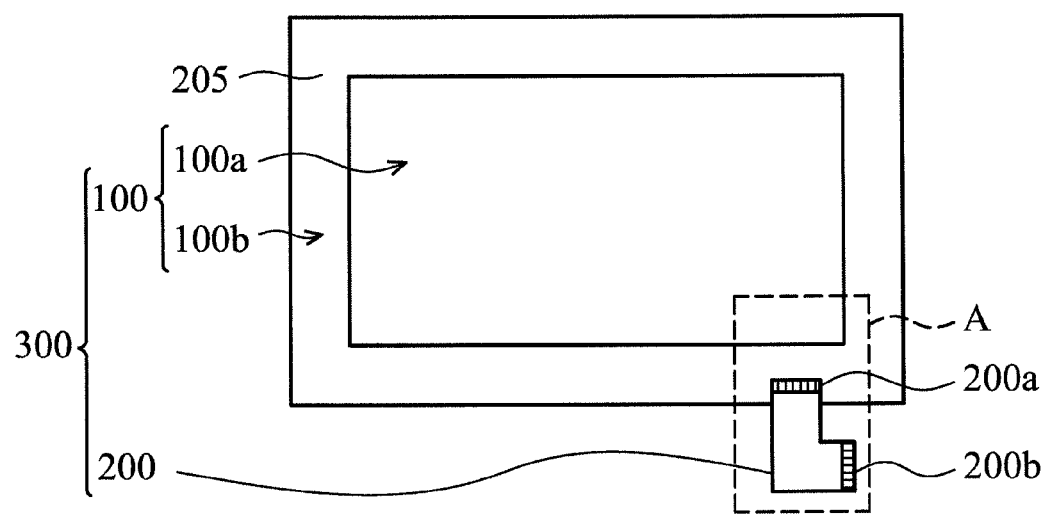
FIG. 1 illustrates a top view of a touch panel having a transparent substrate, a trace structure and a flexible printed circuit (FPC) board in accordance with an embodiment of the invention.
Figure 2:
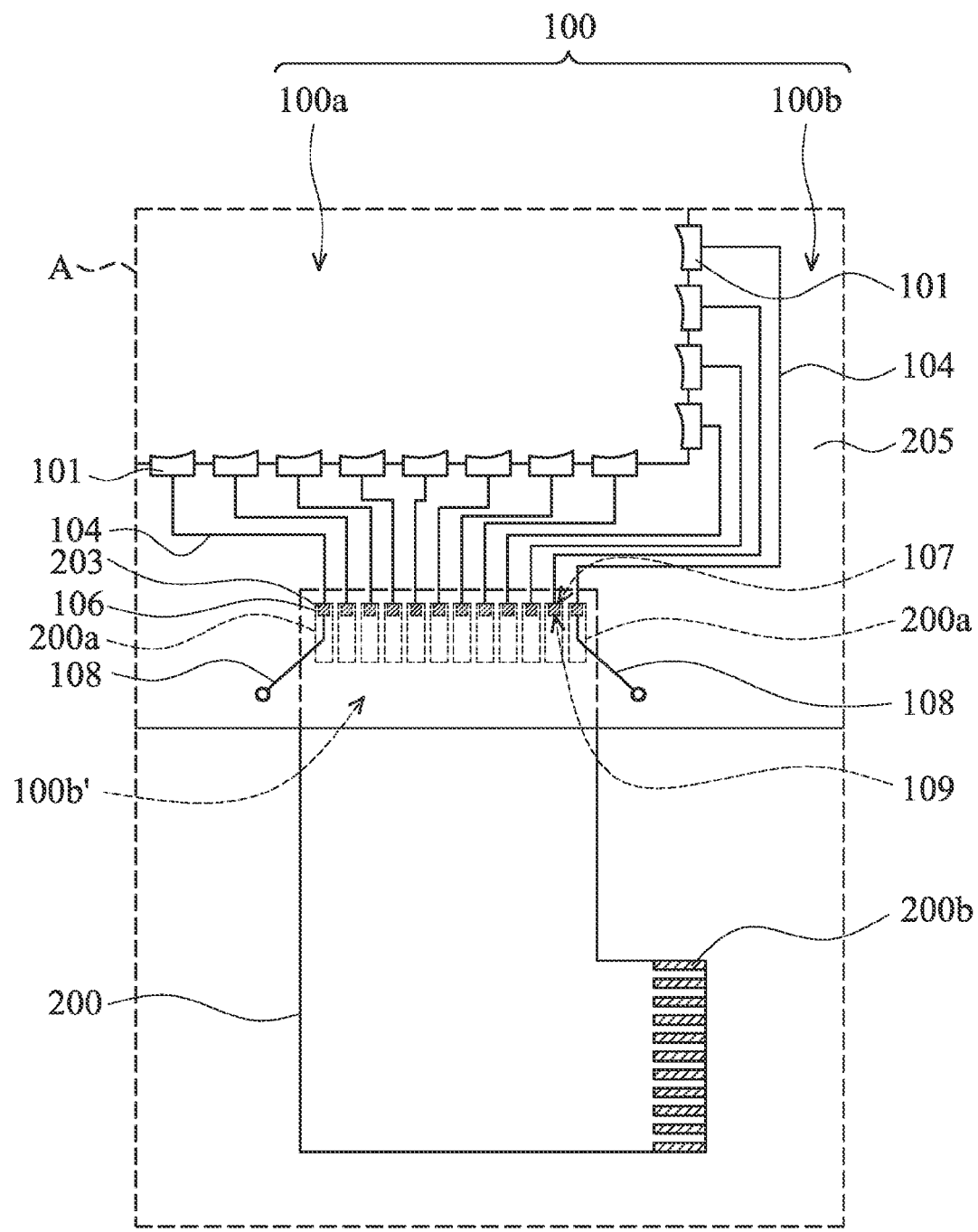
FIG. 2 illustrates an enlarged view of the region A in FIG. 1.

Referring to FIGS. 1 and 2, FIG. 1 illustrates a top view of a touch panel having a a transparent substrate, trace structure and a flexible printed circuit (FPC) board in accordance with an embodiment, and FIG. 2 illustrates an enlarged view of the region A in FIG. 1. In this embodiment, the touch panel 300 includes: a transparent substrate, a trace structure, a FPC board 200, an anisotropic conductive film (ACF) 203, and a shielding layer 205. The trace structure in a touch panel includes: a plurality of traces 104, a plurality of bonding pads 106, and at least two trace extending portions 108. The plurality of traces 104 (for example, aluminum, chrome, copper, alloys thereof, or other known metals) are disposed on a transparent substrate 100 of the touch panel 300. In one embodiment, the transparent substrate 100 may be formed of glass, quartz, or other transparent materials, particularly, tempered glass, so as to provide a touch surface. The transparent substrate 100 has a touch sensing region 100a and a border region 100b, wherein the border region 100b generally surrounds the touch sensing region 100. The plurality of traces 104 are disposed within the border region 100b and on the shielding layer 205.

A sensing structure (not shown) is disposed on the touch sensing region 100a of the transparent substrate 100. The sensing structure includes a plurality of transparent sensing electrodes (for example, an indium tin oxide (ITO) or indium zinc oxide (IZO) layer). It is understood that these sensing electrodes are typically arranged in an array. However, only some transparent electrodes 101 that extend toward the border 100b are illustrated (as shown in FIG. 2) for simplicity. The transparent electrodes 101 are connected to the plurality of traces 104.

In the embodiment, the border region 100b of the transparent substrate 100 includes a flexible printed circuit (FPC) board bonding region 100b', which is the overlapping area of the FPC board 200 and the transparent substrate 100. The FPC board bonding region 100b' provides the bond between the FPC board 200 and the trace structure. For example, the bonding pad 106 is disposed on the border region 100b of the transparent substrate 100 and within the FPC board bonding region 100b'. Each bonding pad 106 has a first side 107 and a second side 109, and the first side 107 of each bonding pad 106 is connected to or extended from one end of a corresponding trace of the plurality of traces 104. It should be realized that only some of the plurality of traces 104 and the corresponding bonding pads 106 are illustrated for simplicity and, the actual amount of the plurality of traces 104 and the corresponding bonding pads 106 depends on the design requirement.

The embodiment is characterized in that at least two trace extending portions 108 are disposed at the border region 100b. In one embodiment, the trace extending portions 108, the bonding pads 106, and the plurality of traces 104 may be formed by a same patterned metal layer (for example, having a material including of aluminum, chrome, copper, alloys thereof, or other known metals). The trace extending portions 108 adjoin the second side 109 of two of the bonding pads 106 and extend from the second sides 109 of the corresponding bonding pads toward the outer edges of the border region.

In one embodiment, the trace extending portions 108 may be bent and extended toward different directions in a manner such that one end of each trace extending portion 108 is disposed at the border region 100b outside of the FPC board bonding region 100b', as shown in FIG. 2. In another embodiment, the trace extending portions 108 may be bent and extended toward a same direction such that one end of each trace extending portion 108 is disposed at the border region 100b outside of the FPC board bonding region 100b'. Yet another embodiment, the entire trace extending portions 108 may be disposed within the FPC board bonding region 100b'. Due to the relativity small spacing between the bonding pads 106, it is difficult to perform probe testing. However, the distance between the ends of the trace extending portions 108 may be adjusted to an appropriate distance, thereby replacing the bonding pads 106 as the test point of the electrical test. The FPC board 200 has a plurality of input pads 200a corresponding to the bonding pads 106, and a plurality of output pads 200b, wherein the input pads 200a are disposed within the FPC board bonding region 100b'. Furthermore, the ACF 203 is disposed between the trace structure and the FPC board 200 such that the input pad 200a of the FPC board 200 corresponds to the bonding pads 106 of the trace structure. In one embodiment, the bonding pads 106 and the plurality of traces may be formed of a same patterned metal layer (for example, having a material including of aluminum, chrome, copper, alloys thereof, or other known metals). The plurality of traces 104 and the corresponding bonding pads 106 are used to electrically connect the corresponding transparent sensing electrode 101 to the external circuits (not shown) through FPC board 200.

The shielding layer 205 is disposed at the border region 100b of the transparent substrate 100 and between the transparent substrate 100 and the plurality of traces 104, and further exposes the touch sensing region 100a in order to function as a light shielding/decorative layer. In one embodiment, the shielding layer may be formed of a colored photoresist material or ink.

Figure 3A:
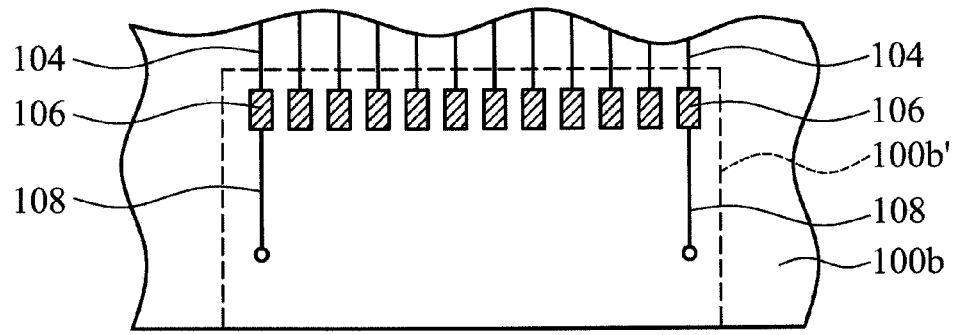
FIGS. 3A-3C illustrate top views of the trace structure in accordance with various embodiments of the invention
Figure 3B:
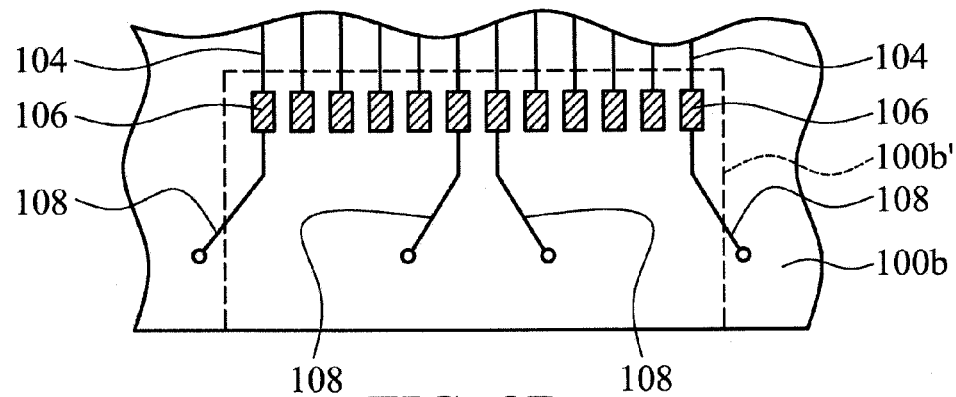
Figure 3C:
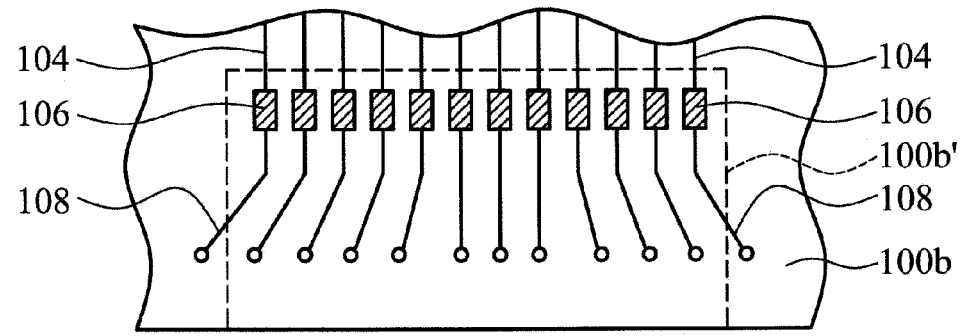

FIGS. 3A-3C illustrate top views of the trace structure in accordance with various embodiments of the invention, wherein repeated reference numerals are used to indicate the components similar to FIGS. 1 and 2 and the description thereof is omitted for simplicity. Referring to FIG. 3A, the embodiment differs from FIG. 2. In the trace structure of such embodiment, trace extending portions 108 are parallel to each other and substantially disposed within the FPC board bonding region 100b'. In other embodiments, the trace extending portions 108 may be bent and extended toward different directions within the FPC board bonding region 100b'.

Referring to FIG. 3B, the embodiment differs from FIG. 2. The trace structure may have more than two trace extending portions 108 (for example, four trace extending portions 108), wherein the trace extending portions 108 may be bent and extended toward different directions. Further, the trace extending portions 108 may be substantially disposed within the FPC board bonding region 100b', or one end of all or some of the trace extending portions 108 may be disposed at the border region 100b outside of the FPC board bonding region 100b'. For simplicity, only two trace extending portions 108 disposed within the FPC board bonding region 100b are illustrated, and the other two trace extending portions 108 each have an end disposed at the border region 100b outside of the FPC board bonding region 100b'.

Referring to FIG. 3C, the embodiment differs from FIG. 2. In the trace structure, the amount of the trace extending portions 108 is the same as and corresponds to that of the bonding pads 106. Further, the trace extending portions 108 are arranged in a fan-out form within the border region 100b. In this embodiment, the trace structure includes some trace extending portions 108 which are parallel to each other and some other trace extending portions 108 which are bent and extended toward different directions. In addition, the trace extending portions 108 may be substantially disposed within the FPC board bonding region 100b', or one end of all or some of the trace extending portions 108 may be disposed at the border region 100b outside of the FPC board bonding region 100b'. It is understood that the arrangement and the amount of the trace extending portions 108 may depend on the design requirement and are not limited to the above embodiments.

Figure 4:
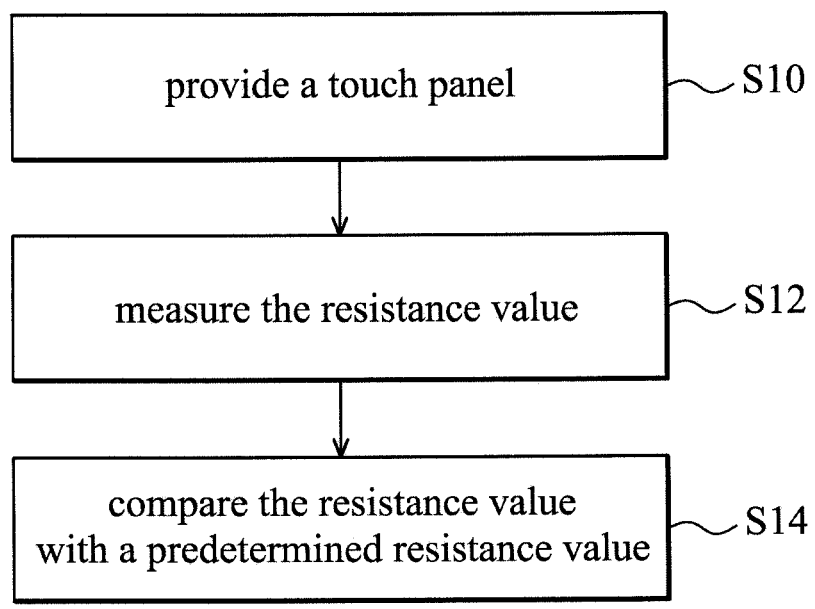
FIG. 4 illustrates a flow chart of an electrical testing method in accordance with an embodiment of the invention.

Referring to FIG. 4, a flow chart of an electrical testing method in accordance with an embodiment is illustrated. Firstly, in step S10, a touch panel is provided. The touch panel includes a trace structure and a flexible printed circuit (FPC) board. The touch panel may be the touch panel shown in FIGS. 1 and 2 and the trace structure for the touch panel may be the trace structures shown in FIGS. 3A-3C, and hence will not be described herein. Next, in step S12, a predetermined resistance value may be set up, and a probe may be utilized to measure the resistance value between each trace extending portion and the corresponding output pad in the FPC board. Lastly, in step S14, the predetermined resistance value and the measured resistance value are compared. If the measured resistance value is greater than the predetermined resistance value, the input pad of the FPC board is determined as being electrically disconnected from the bonding pads of the trace structure, or the anisotropic conductive film (ACF) is determined as being malfunctioned, or the touch panel is determined as a defective product or a product to be reworked. Accordingly, the above testing method may replace the conventional visual inspection or the way of applying an electrical test to the electrode (the output pad) corresponding to the testing pad on the FPC board.

According to the above embodiments, owing to the trace extending portions being used as a test point of the electrical test, disposal of an additional testing pad (dummy pad) is not required, thereby increasing the routing flexibility of the plurality of traces. As a result, the width or the frontal margin (the distance between the edges of the touch sensing region and the outer edges of the border region) may be reduced due to the empty space reserved for the testing pad. Therefore, the area of touch sensing region in the touch panel may be increased, or the size of the touch panel may be reduced. Furthermore, the size of FPC board may be reduced since the testing pad is not required to be disposed at the outer side of the bonding pad, and thereby costs are reduced. In addition, the number of times of the electrical test may be reduced since the electrical test of the touch panel may be performed by using the trace extending portions after the FPC board is bonded, thereby drastically decreasing the testing time.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A touch panel, comprising:
   a trace structure for a touch panel having a transparent substrate with a touch sensing region and a border region surrounding the touch sensing region, the trace structure comprising:
   a plurality of traces disposed on the transparent substrate and within the border region;
   a plurality of bonding pads disposed in the border region of the transparent substrate, wherein each bonding pad has a first side and a second side, and the first side of each bonding pad is connected to a corresponding trace of the plurality of traces; and
   at least two trace extending portions extended toward an outer edge of the border region from the second side of two of the plurality of bonding pads;
   a flexible printed circuit (FPC) board having a plurality of output pads and a plurality of input pads corresponding to the plurality of bonding pads, wherein the input pads are bonded to the bonding pads; and
   an anisotropic conductive film (ACF) disposed between the trace structure and the FPC board.

2. The touch panel of claim 1, further comprising a shielding layer disposed within the border region of the transparent substrate.

3. The touch panel of claim 2, wherein the shielding layer is disposed between the transparent substrate and the plurality of traces.

4. The touch panel of claim 2, wherein the shielding layer exposes the touch sensing region.

5. An electrical testing method, comprising:
   providing the touch panel of claim 1; and
   measuring a resistance value between each trace extending portion and the corresponding output pad in the FPC board.

6. The electrical testing method of claim 5, further comprising:
   defining a predetermined resistance value; and
   comparing the resistance value with the predetermined resistance value.

7. The electrical testing method of claim 6, wherein the input pads of the FPC board is determined as being electrically disconnected from the bonding pads of the trace structure if the measured resistance value is greater than the predetermined resistance value.

8. The electrical testing method of claim 6, wherein the anisotropic conductive film (ACF) is determined as malfunctioned if the measured resistance value is greater than the predetermined resistance value.

9. The electrical testing method of claim 6, wherein the touch panel is determined as a defective product or a reworked product if the measured resistance valued is greater than the predetermined resistance value.

* * * * *